April 7, 1925.

L. C. JOSEPHS, JR 1,532,699

BOGIE TRUCK FOR SELF PROPELLED RAIL CARS

Filed Aug. 15, 1923     3 Sheets-Sheet 2

INVENTOR
Lyman C. Josephs, Jr.
BY
Redding, Greeley, Shea & Campbell
ATTORNEYS

April 7, 1925.
L. C. JOSEPHS, JR
BOGIE TRUCK FOR SELF PROPELLED RAIL CARS
Filed Aug. 15, 1923
1,532,699
3 Sheets-Sheet 3
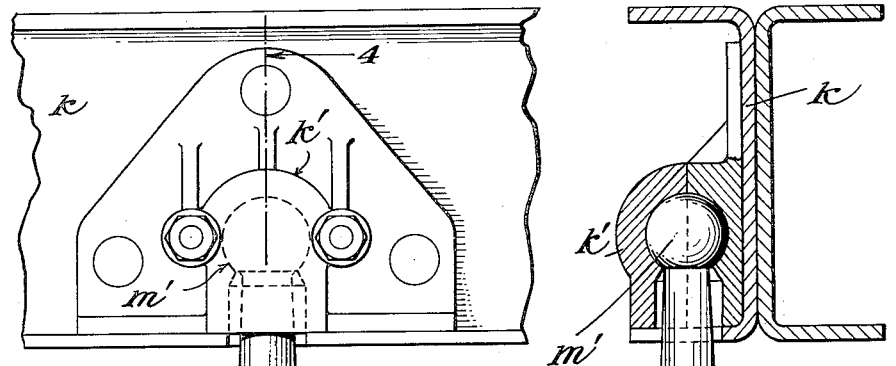
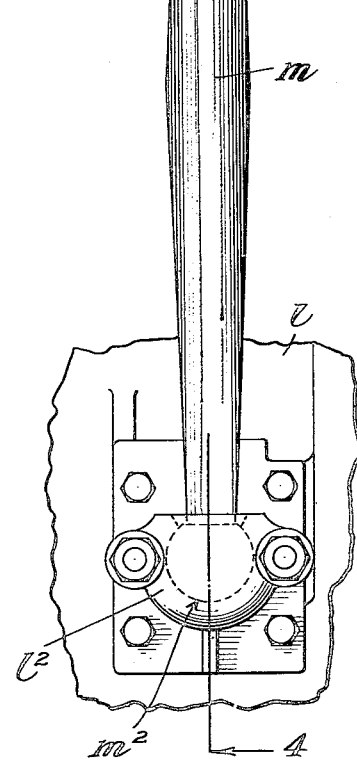
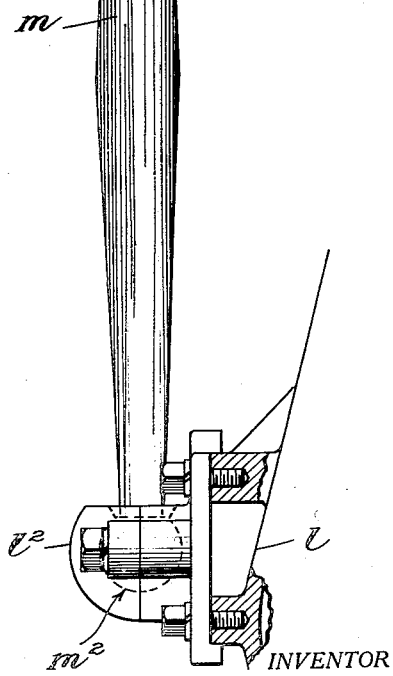

Patented Apr. 7, 1925.

1,532,699

UNITED STATES PATENT OFFICE.

LYMAN C. JOSEPHS, JR., OF ALLENTOWN, PENNSYLVANIA, ASSIGNOR TO INTERNATIONAL MOTOR COMPANY, OF NEW YORK, N. Y., A CORPORATION OF DELAWARE.

BOGIE TRUCK FOR SELF-PROPELLED RAIL CARS.

Application filed August 15, 1923. Serial No. 657,482.

*To all whom it may concern:*

Be it known that I, LYMAN C. JOSEPHS, Jr., a citizen of the United States, residing in the city of Allentown, in the State of Pennsylvania, have invented certain new and useful Improvements in Bogie Trucks for Self-Propelled Rail Cars, of which the following is a specification, reference being had to the accompanying drawings, forming a part hereof.

This invention relates generally to features of construction of a bogie truck for rail cars propelled by an internal combustion engine but also includes features of construction in which the truck is self-propelled, that is, itself carries the internal combustion engine and transmission for the car. It is to be understood as the description proceeds that certain of the claims are addressed to those improvements which are equally applicable to the two types of trucks while others are addressed to details having to do with the suspension of a motor and its transmission on a bogie truck.

The principal object of the invention is to provide a construction which shall be simple, clean, efficient, and in which standard railway practice is as closely adhered to as possible. For instance, it has to do with the suspension of the motor and transmission and with the mounting of the springs on the axles to the end that weights will be properly distributed, suitable rigidity assured and an easy riding suspension obtained in which comparatively free relative motion is afforded between parts at those points where most important. Still another feature of the invention has to do with the disposition of the motor with respect to the transmission and the provision of back gearing therebetween and driving mechanism which will afford some relative movement both vertically and horizontally between the transmission and the motor without affecting materially the efficient transmission of power. More particularly, the invention seeks to provide, in a self-propelled bogie truck, for the mounting of the motor on the truck frame and the suspension of the transmission, half on the frame and half on the axle, so that the transmission will follow, to some degree, movements of the axle and, to some degree movements of the truck. In accordance with the last named object of the invention a link connection is interposed between the free end of the transmission and the frame and is so connected to both as to permit angular movement of the transmission.

Another feature of the invention has to do with the supporting of the car body on the truck on a king pin, and the transmission of the load to the springs through equalizing bars whereby all four wheels of the truck may be maintained on the rails when passing over inequalities in the truck. In accomplishing the purposes of the invention it is further proposed to provide two sets of springs having their remote ends fixed in a yielding anchorage and their inner ends free to move under elongation with respect to the equalizing levers. In such a construction it is further proposed to mount the springs in such relation to the axles as to be movable relatively therewith under elongation.

In the drawings there is illustrated a bogie truck on which is supported an internal combustion engine for propelling the same and a transmission through which power is delivered to the driving axle. In the drawings:

Figure 3 is a view in front elevation of the supporting link extending between the free end of the transmission and the truck.

Figure 4 is a view partly in side elevation and partly in section showing the ball and socket connection for the link.

Figure 1:
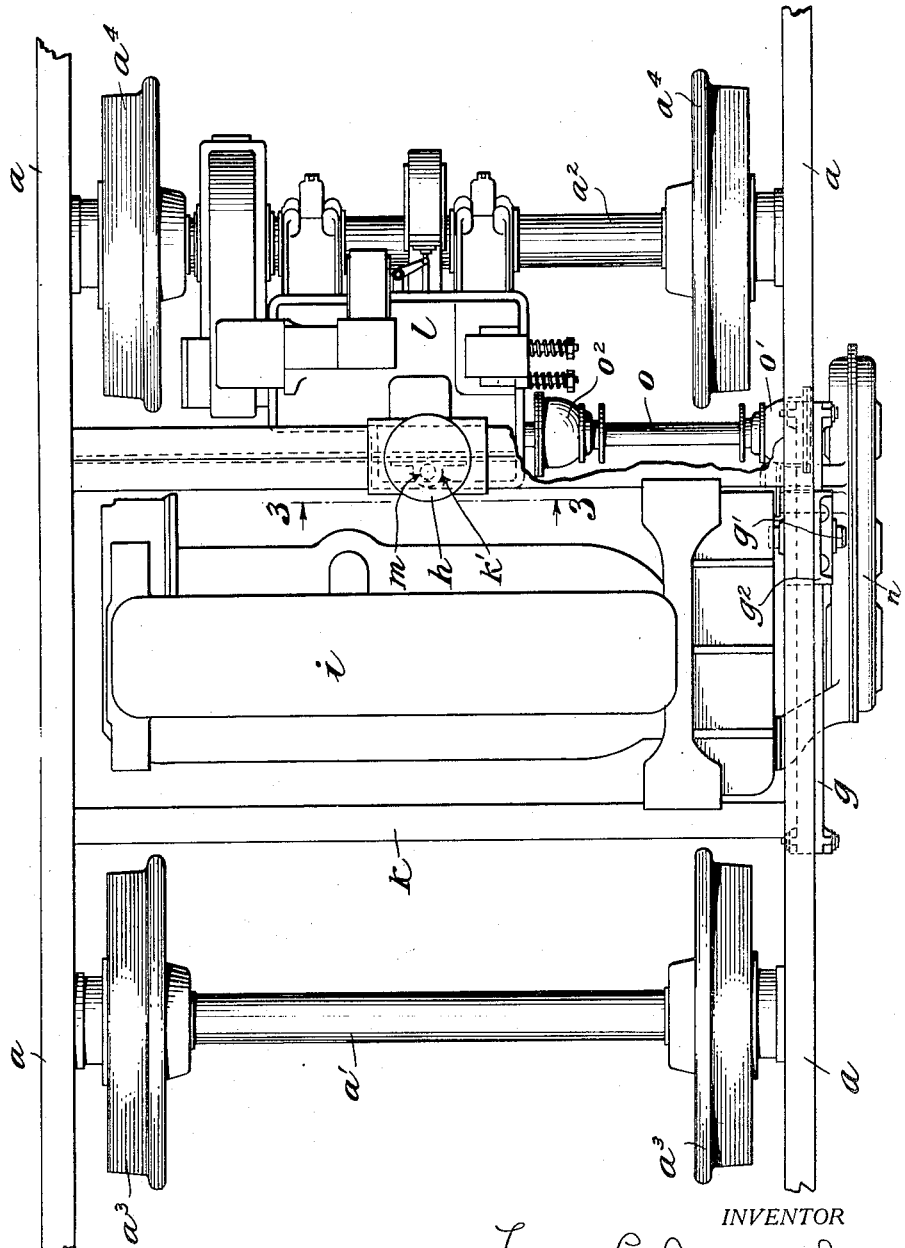
Figure 1 is a view in plan of the improved truck showing particularly the driving connection between the motor and transmission for affording relative movement therebetween.
Figure 2:
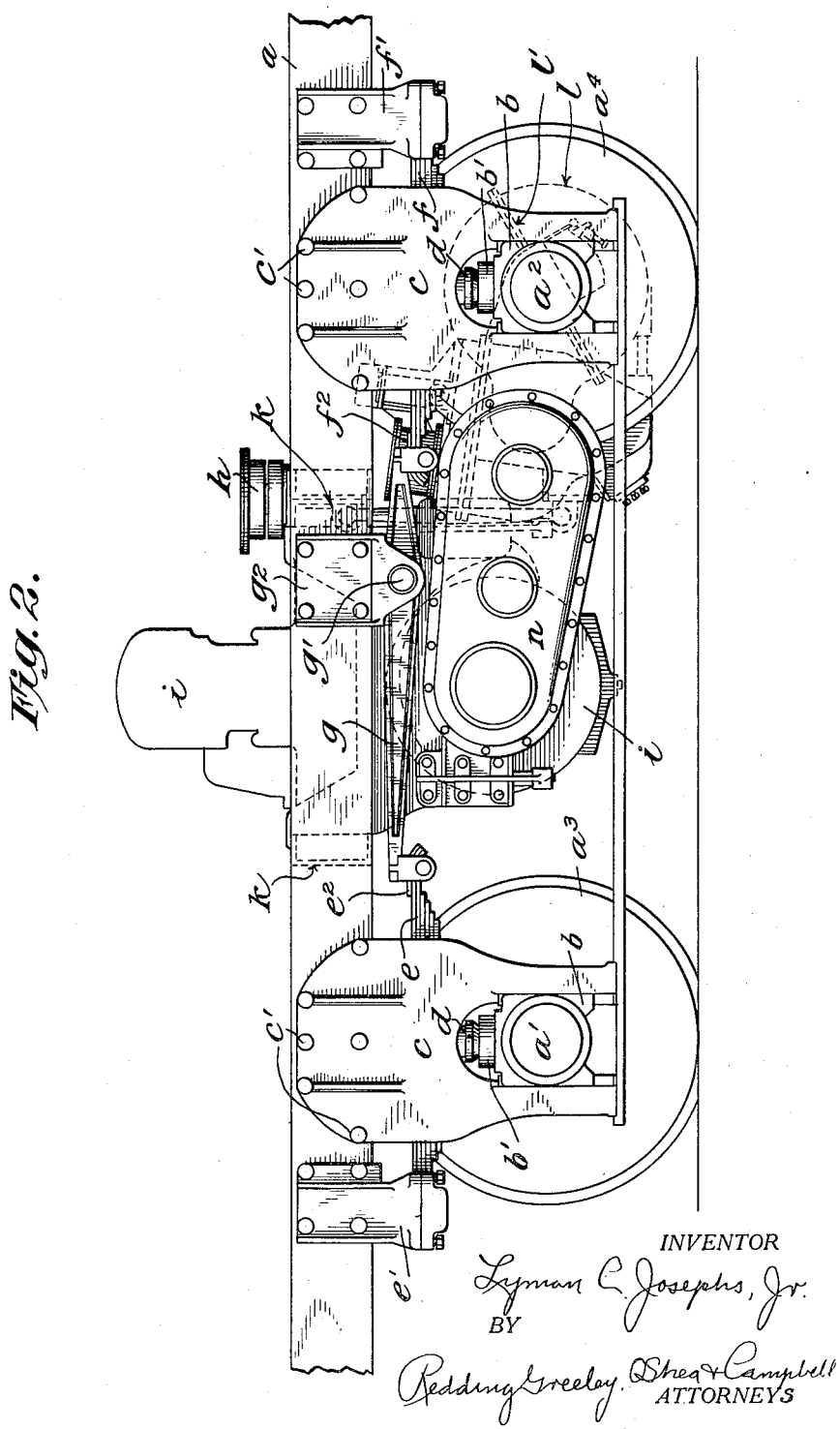
Figure 2 is a view in side elevation of the improved truck and suspension elements.

The spring suspension embodied in the improved bogie truck will first be described inasmuch as this suspension is applicable to trucks which are not self-propelled as well as trucks, as in the illustrated embodiment, which are self-propelled. The truck includes a chassis made up of frame members $a$ which extend along the sides and across the ends (although the end frame members are omitted in the drawings) and this chassis is supported on axles $a'$, $a^2$, carried with flanged wheels $a^3$, $a^4$, mounted through journal boxes $b$ movable vertically within depending slotted brackets $c$ bolted rigidly as at $c'$ to the side frame members. On the journal boxes are carried pedestals $b'$ which have their upper surfaces formed as cups to receive the spherical lower ends of spring posts $d$ on which are supported at the mid-sections leaf springs $e$, $f$, over the respective axles $a'$, $a^2$. These springs, of course, are disposed in pairs on the journal boxes at opposite ends of the respective axles. The problem is to support the weight of the car body on the journal boxes and the intermediary of these springs in such manner as to give the best riding qualities, adequate ruggedness, and permit the necessary elongation of the various springs under relative movements between the various journal boxes and the chassis of the truck. These purposes are accomplished in the improved construction by mounting the remote ends of the various springs in rubber blocks in accordance with Letters Patent of the United States No. 1,404,876 dated January 31, 1922. As shown in side elevation at Figure 2 the springs $e$ and $f$ have their remote ends supported yieldingly in such non-metallic connections, not illustrated in detail but represented by the housings $e'$, $f'$, respectively, bolted to the side frame member $a$ and having open sides to admit the ends of the respective springs and confining the ends by means of rubber blocks seated within said housings. The proximate ends of the respective pairs of springs are not fixed relatively but are connected to the chassis of the truck loosely and in such manner as to admit of free elongation. To this end, the springs $e$ and $f$ (as well as the other springs of the pair) have on their proximate ends plates $e^2$, $f^2$, on which rest the ends of an equalizing bar $g$ pivoted as at $g'$ in a bracket $g^2$ bolted to the chassis. The car body (not illustrated) is connected to the truck chassis through the king pin connection $h$ which may be of any suitable form.

The action of the suspension described is as follows: The remote ends of the various springs $e$, $f$, are relatively fixed in the cross-connections indicated at $e'$, $f'$ while their proximate ends are free to move with respect to each other through the equalizing bar $g$ which rests thereon. Application of the load on the various springs according to the distribution thereof is secured by placing the pivot $g'$ for the equalizer bar coincident with the center of load; the application of the load generally between the two axles $a'$, $a^2$ being controlled by the point at which the king pin connection $h$ is disposed between these two axles. In the case of a truck which is not self-propelled it may be satisfactory to distribute the load equally to the four springs but in the case of a self-propelled truck, as illustrated, it may be desirable, in the interest of traction, to place a larger portion of the load on the driving axle $a^2$. With the remote ends of the springs $e$, $f$, relatively fixed in the housings $e'$, $f'$, it is evident that the elongation of the springs will bring about a displacement of the supporting posts $d$ with respect to the socket pedestals $b'$ in which they rest on the journal boxes $b$. Since the pedestals are formed with cup-like seats on their upper surfaces and since the bearing ends of the posts $d$ are spherical but of a diameter smaller than that of the seat, relative displacement therebetween is facilitated. Since the journal boxes $b$ are confined by the brackets $c$ driving, pulling and breaking forces between the axles and the trucks will be transmitted.

Consideration will now be devoted to those features which are peculiar to a self-propelled truck of the type illustrated. These features have to do particularly with the mounting of the motor and the transmission with respect to each other and with respect to the truck to the end that both are adequately sprung and undue movement therebetween prevented. The motor indicated generally at $i$ is supported transversely between the side frame members $a$ and on the transverse sills $k$ in any approved manner, as through a three-point suspension. The change speed transmission indicated generally at $l$ has a split case provided at $l'$ to permit of its direct mounting on the driving axle $a^2$ in a manner which will be evident from Figure 2. The other end of the case $l$, however, instead of being supported on the axle is connected to the truck chassis, that is, to one of the cross-channel members $k$, to the end that the transmission as a whole may be partly spring supported and partly carried on the axle. Figures 3 and 4 illustrate most clearly the preferred means for connecting the front end of the case $l$ to the cross-member $k$. A vertically disposed link $m$ is employed having ball ends $m'$, $m^2$, confined by socket plates $k'$, $l^2$, respectively, to facilitate assembling and disassembling and to afford a limited degree of universal movement between the link and the case $l$ as well as the cross-frame member $k$. With such a suspension it is evident that the transmission as a whole may have a limited degree of oscillation about the axle $a^2$ following relative movements between the axle and the truck frame. The motor $i$ is connected operatively to the transmission through back-gearing which may be of any conventional character and shown as disposed within a gear case $n$ having a removable cover exposed at one side of the truck. From the back-gearing power is taken to the transmission through a propeller shaft $o$ which has included therein two universal joints $o'$, $o^2$, to afford sufficient angularity at those points to compensate for relative movement between the motor which is on the truck and the transmission which is partly supported on the axle and only partly follows relative movements between the axle and the truck. Telescoping of the shaft with respect to at least one of the joints may be permitted to compensate for variations in the mean distance between the joints.

By the construction described full spring suspension for the motor is obtained. Partial spring suspension is secured for the transmission and yet the transmission partakes of the movements of the driven axle sufficiently to reduce the effective amplitude of movement between the axle and the truck frame and which must necessarily be compensated for in transmitting driving forces from the engine to the axle. The necessary compensation for such movements is taken care of by the transmission devices between the motor and the transmission. All of the parts are readily accessible and particularly the back-gearing which may be exposed by removal of the cover $n$ for their casing which, as noted, is disposed at the side of the truck.

Changes in details of design and arrangement may be made without departing from the spirit of the invention.

What I claim is:

1. In a self-propelled bogie truck a chassis frame, springs to support the frame on the axles, a propelling motor mounted on the frame, a change speed transmission, means to mount the transmission partly on the driven axle and pivotal means to support it partly on the frame, and means to connect the motor with the transmission in driving engagement.

2. In a self-propelled truck in combination with a chassis frame, axles and wheels, springs to mount the frame on the axles, means to mount the motor transversely of the frame between the axles, a change speed transmission having a split case supported adjacent one end on the driven axle, a pivotal connection between the other end of the case and the frame, back-gearing transmitting the power from the motor and a propeller shaft between the back-gearing and the transmission disposed in substantial parallelism to the motor.

3. In a self-propelled truck in combination with a chassis frame, axles and wheels, springs to mount the frame on the axles, means to mount the motor transversely of the frame between the axles, a change speed transmission having a split case supported adjacent one end on the driven axle, a pivotal connection between the other end of the case and the frame, back-gearing transmitting the power from the motor, a propeller shaft between the back-gearing and the transmission disposed in substantial parallelism to the motor, and a plurality of universal joints interposed between the back-gearing and the transmission to compensate for relative movements between the driven axle and the frame.

4. In a self-propelled truck in combination with a chassis frame, axles and wheels, springs to mount the frame on the axles, means to mount the motor transversely of the frame between the axles, a change speed transmission having a split case supported adjacent one end on the driven axle, a pivotal connection between the other end of the case and the frame, back-gearing transmitting the power from the motor, a case for said back-gearing disposed at one side of the frame and an exposed removable cover for the case, and a propeller shaft between the back-gearing and the transmission disposed in substantial parallelism to the motor.

5. In a self-propelled bogie truck, a chassis frame, springs to support the frame on the axles, a propelling motor mounted on the frame, a change speed transmission having a split case supported adjacent one end on the driven axle, a pivotal connection between the other end of the case and the frame, and means to connect the motor with the transmission in driving engagement.

This specification signed this 12th day of July, A. D. 1923.

LYMAN C. JOSEPHS, JR.